(12) United States Patent
McLain et al.

(10) Patent No.: US 6,785,526 B2
(45) Date of Patent: Aug. 31, 2004

(54) METHOD AND APPARATUS USING EVENT CORRELATION FOR IDENTIFYING AN INTERFERING MOBILE TERMINAL

(75) Inventors: Christopher John McLain, Seattle, WA (US); Gary V. Stephenson, Bellevue, WA (US); Michael de La Chapelle, Bellevue, WA (US)

(73) Assignee: The Boeing Company, Chicago, IL (US)

(*) Notice: Subject to any disclaimer, the term of this patent is extended or adjusted under 35 U.S.C. 154(b) by 174 days.

(21) Appl. No.: 10/008,401

(22) Filed: Dec. 6, 2001

(65) Prior Publication Data

US 2002/0146995 A1 Oct. 10, 2002

Related U.S. Application Data

(60) Provisional application No. 60/281,356, filed on Apr. 4, 2001.

(51) Int. Cl.[7] .............................. H04B 1/10; H04B 7/185
(52) U.S. Cl. ..................... 455/296; 455/67.11; 455/12.1
(58) Field of Search ............................... 455/12.1, 13.2, 455/13.4, 296, 295, 271, 427, 67.11, 67.13, 456.3

(56) References Cited

U.S. PATENT DOCUMENTS

| | | | |
|---|---|---|---|
| 5,822,429 A | 10/1998 | Casabona et al. .............. 380/9 |
| 5,930,680 A | 7/1999 | Lusignan .................... 455/12.1 |
| 6,075,969 A | 6/2000 | Lusignan .................... 455/3.2 |
| 6,091,936 A | 7/2000 | Chennakeshu et al. ....... 455/63 |
| 6,107,960 A | 8/2000 | Krasner .................. 342/351.09 |
| 6,169,881 B1 * | 1/2001 | Astrom et al. ............. 455/12.1 |
| 6,272,679 B1 | 8/2001 | Norin ........................... 725/62 |
| 6,330,462 B1 | 12/2001 | Chen .......................... 455/512 |
| 6,597,892 B1 * | 7/2003 | Caldwell et al. ............ 455/12.1 |
| 2002/0050944 A1 * | 5/2002 | Sheynblat et al. ...... 342/357.06 |

FOREIGN PATENT DOCUMENTS

EP  1 052 790 A1  5/1999

OTHER PUBLICATIONS

UHF SATCOM Downlink Interference for the Mobile Platform, Military Communications Conference, 1996, pp. 22–28, E. Franke.

* cited by examiner

*Primary Examiner*—Nay Maung
*Assistant Examiner*—Edan Orgad
(74) *Attorney, Agent, or Firm*—Harness Dickey & Pierce P.L.C.

(57) ABSTRACT

A system and method for quickly detecting and remedying an interference incident caused by one of a plurality of mobile terminals in communication with a transponded satellite. The method makes use of a time line constructed from communications of each of the mobile terminals. The time line forms a real time, sequential record of events wherein various mobile terminals have made contact with the transponded satellite. The method extrapolates from the time line which one of the mobile terminals has caused an interfering event by determining which mobile terminal accessed the communication system just prior to the interference event arising.

15 Claims, 3 Drawing Sheets

METHOD AND APPARATUS USING EVENT CORRELATION FOR IDENTIFYING AN INTERFERING MOBILE TERMINAL

CROSS REFERENCE TO RELATED APPLICATIONS

This application claims priority from provisional application Serial No. 60/281,356, filed Apr. 4, 2001.

FIELD OF THE INVENTION

The present invention relates to mobile RF terminals required to conduct bi-directional communications with a base station via a satellite link, and more particularly to a method and apparatus for identifying which one of a plurality of mobile terminals is causing interference with one or more satellites orbiting adjacent a target satellite.

BACKGROUND OF THE INVENTION

With mobile RF terminals located on mobile platforms such as aircraft, cruise ships and other moving platforms, communicating with a ground station via a transponded satellite, there is always the remote possibility, in spite of the safeguards that may be built into the mobile terminal, that the terminal may fail in an unanticipated manner. In such event, there is the possibility that the mobile terminal may cause interference with other satellites orbiting in the geo arc adjacent to the target satellite with which the mobile terminal had been communicating.

It is also recognized that Fixed Services Satellite (FSS) operators may have difficulty in locating interference from VSAT (Very Small Aperture Terminal) systems that consist of thousands of unsophisticated terminals at remote sites.

Therefore, there exists a need for a ground station in communication with a plurality of mobile terminals via a transponded satellite to be able to quickly identify a malfunctioning mobile terminal which is causing interference with non-target satellites and to quickly resolve the interference incident.

SUMMARY OF THE INVENTION

The present invention relates to a system and method for determining which one of a plurality of mobile terminals is causing an interference situation with one or more non-target satellites orbiting adjacent a target satellite with which the mobile terminals are communicating. The system and method involves having each mobile terminal periodically transmit, via the transponded satellite, signals to a base station, such as a ground-based network operations center (NOC), indicating various operational parameters of the mobile terminal as well as operational parameters of the mobile platform (e.g., aircraft) on which the terminal is located. These various operational parameters include the position of the mobile platform (i.e., longitude and latitude), attitude information (e.g., heading, pitch and roll of an aircraft), instances of aircraft establishing communications with the NOC, data rate and changes in the transmissions from each mobile terminal, power control commands being sent by the NOC to the mobile terminals, as well as any operating anomalies detected by the NOC.

All of the above information/events are logged (i.e., recorded) by the NOC in real time, as well as the time of day that each event occurs. The result is a real time "time line" of transmissions/events that the NOC has logged and which can be quickly reviewed in a matter of seconds when needed.

If the NOC learns that interference is occurring with a non-target satellite, the above-described time line of transmissions/events can be quickly reviewed to determine that particular transmission/event that occurred just prior to the time that the interference began to occur. The NOC can then quickly determine which particular mobile terminal has caused the interference and transmit the appropriate commands to the interfering mobile terminal to eliminate the interference or to instruct the mobile terminal to stop transmitting completely. The above process can be carried out in seconds by the NOC as soon the NOC learns that an interference condition has arisen.

BRIEF DESCRIPTION OF THE DRAWINGS

The following description of the preferred embodiment is merely exemplary in nature and is in no way intended to limit the invention, its application, or uses.

DETAILED DESCRIPTION OF THE PREFERRED EMBODIMENTS

Figure 1:
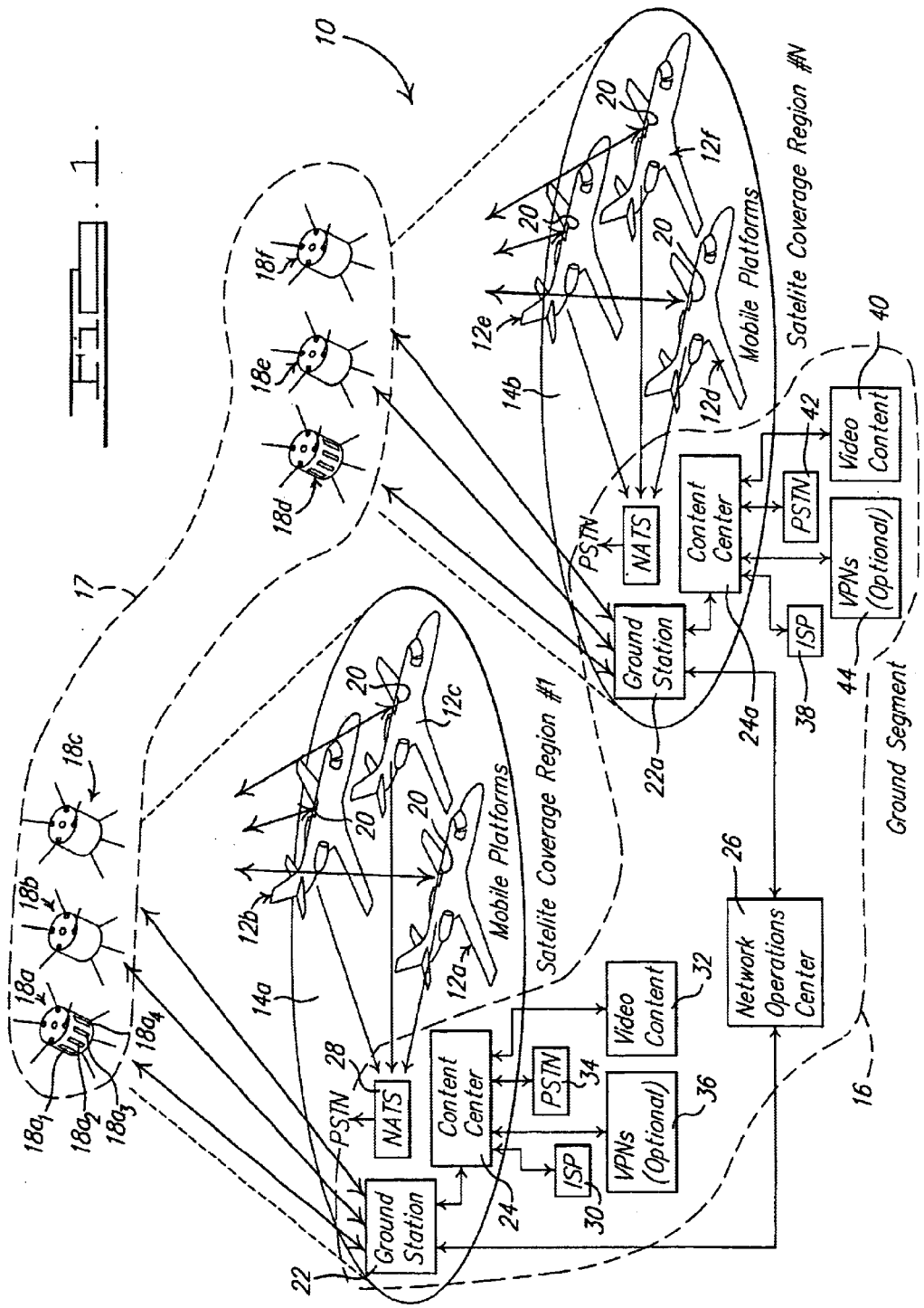
FIG. 1 is a simplified block diagram drawing of the system used to implement the interference detection and correction method of the present invention.

Referring to FIG. 1, there is shown a system 10 for implementing a preferred method of the personal invention. The system 10 provides data content to and from a plurality of mobile platforms 12a–12f in one or more distinct coverage regions 14a and 14b. The system 10 generally comprises a ground segment 16, a plurality of satellites 18a–18f forming a space segment 17, and a mobile terminal 20 disposed on each mobile platform 12. The mobile platforms 12 could comprise aircraft, cruise ships or any other moving vehicle. Thus, the illustration of the mobile platforms 12 as aircraft in the figures herein, and the reference to the mobile platforms as aircraft throughout the following description should not be construed as limiting the applicability of the system 10 to only aircraft.

The space segment 17 may include any number of satellites 18 in each coverage region 14a and 14b needed to provide coverage for each region. Satellites 18a, 18b, 18d and 18e are preferably Ku or Ka-band satellites. Satellites 18c and 18f are Broadcast Satellite Services (BSS) satellites. Each of the satellites 18 are further located in a geostationary orbit (GSO) or a non-geostationary orbit (NGSO). Examples of possible NGSO orbits that could be used with this invention include low Earth orbit (LEO), medium Earth orbit (MEO) and highly elliptical orbit (HEO). Each of the satellites 18 includes at least one radio frequency (RF) transponder, and more preferably a plurality of RF transponders. For example satellite 18a is illustrated having four transponders $18a_1$–$18a_4$. It will be appreciated that each other satellite 18 illustrated could have a greater or lesser plurality of RF transponders as required to handle the anticipated number of aircraft 12 operating in the coverage area. The transponders provide "bent-pipe" communications between the aircraft 12 and the ground segment 16. The frequency bands used for these communication links could comprise any radio frequency band from approximately 10 MHz to 100 GHz. The transponders preferably comprise Ku-band transponders in the frequency band designated by the Federal Communications Commission (FCC) and the International Telecommunications Union (ITU) for fixed satellite services FSS or BSS satellites. Also, different types of transponders may be employed (i.e., each satellite 18 need not include a plurality of identical types of transponders) and each transponder may operate at a different frequency. Each of the transponders $18a_1$–$18a_4$ further include wide geographic coverage, high effective isotropic radiated power (EIRP) and high gain/noise temperature (G/T).

With further reference to FIG. 1, the ground segment 16 includes a ground station 22 in bi-directional communication with a content center 24 and a network operations center (NOC) 26. A second ground station 22a located in the second coverage area 14b may be used if more than one distinct coverage area is required for the service. In this instance, ground station 22a would also be in bi-directional communication with the NOC 26 via a terrestrial ground link or any other suitable means for establishing a communication link with the NOC 26. The ground station 22a would also be in bi-directional communication with a content center 24a. For the purpose of discussion, the system 10 will be described with respect to the operations occurring in coverage region 14a. However, it will be understood that identical operations relative to the satellites 18d–18f occur in coverage region 14b. It will also be understood that the system 10 may be scaled to any number of coverage regions 14 in the manner just described.

The ground station 22 comprises an antenna and associated antenna control electronics needed for transmitting data content to the satellites 18a and 18b. The antenna of the ground station 22 may also be used to receive data content transponded by the transponders $18a_1$–$18a_4$ originating from each mobile terminal 20 of each aircraft 12 within the coverage region 14a. The ground station 22 may be located anywhere within the coverage region 14a. Similarly, ground station 22a, if incorporated, can be located anywhere within the second coverage area 14b.

The content center 24 is in communication with a variety of external data content providers and controls the transmission of video and data information received by it to the ground station 22. Preferably, the content center 24 is in contact with an Internet service provider (ISP) 30, a video content source 32 and a public switched telephone network (PSTN) 34. Optionally, the content center 24 can also communicate with one or more virtual private networks (VPNs) 36. The ISP 30 provides Internet access to each of the occupants of each aircraft 12. The video content source 32 provides live television programming, for example, Cable News Network® (CNN) and ESPN®. The NOC 26 performs traditional network management, user authentication, accounting, customer service and billing tasks. The content center 24a associated with the ground station 22a in the second coverage region 14b would also preferably be in communication with an ISP 38, a video content provider 40, a PSTN 42, and optionally a VPN 44. An optional air telephone system 28 may also be included as an alternative to the satellite return link.

Figure 2:
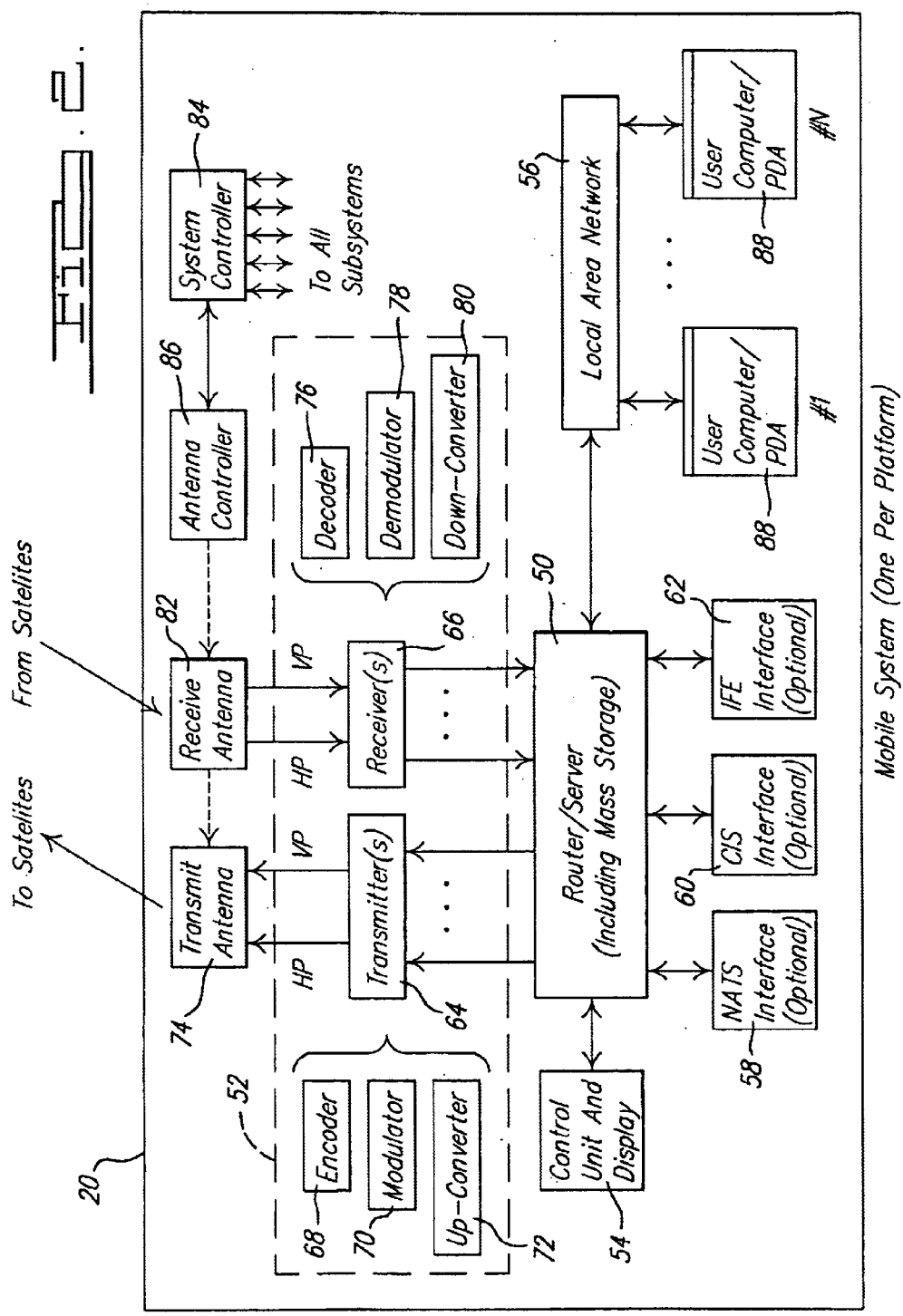
FIG. 2 is a simplified block diagram of one mobile terminal.

Referring now to FIG. 2, the mobile terminal 20 disposed on each aircraft 18 will be described in greater detail. Each mobile terminal 20 includes a data content management system in the form of a router/server 50 (hereinafter "server") which is in communication with a communications subsystem 52, a control unit and display system 54, and a distribution system in the form of a local area network (LAN) 56. Optionally, the server 50 can also be configured for operation in connection with a National Air Telephone System (NATS) 58, a crew information services system 60 and/or an in-flight entertainment system (IFE) 62.

The communications subsystem 52 includes a transmitter subsystem 64 and a receiver subsystem 66. The transmitter subsystem 64 includes an encoder 68, a modulator 70 and an Up-converter 72 for encoding, modulating and up-converting data content signals from the server 50 to a transmit antenna 74. The receiver subsystem 66 includes a decoder 76, a demodulator 78 and a down-converter 80 for decoding, demodulating and down-converting signals received by the receive antenna 82 into base band video and audio signals, as well as data signals. While only one receiver subsystem 66 is shown, it will be appreciated that preferably a plurality of receiver subsystems 66 will typically be included to enable simultaneous reception of RF signals from a plurality of RF transponders. If a plurality of receiver subsystems 66 are shown, then a corresponding plurality of components 76–80 will also be required.

The signals received by the receiver subsystem 66 are then input to the server 50. A system controller 84 is used to control all subsystems of the mobile system 20. The system controller 84, in particular, provides signals to an antenna controller 86 which is used to electronically steer the receive antenna 82 to maintain the receive antenna pointed at a particular one of the satellites 18, which will hereinafter be referred to as the "target" satellite. The transmit antenna 74 is slaved to the receive antenna 82 such that it also tracks the target satellite 18. It will be appreciated that some types of mobile antennas may transmit and receive from the same aperture. In this case the transmit antenna 74 and the receive antenna 82 are combined into a single antenna.

With further reference to FIG. 2, the local area network (LAN) 56 is used to interface the server 50 to a plurality of access stations 88 associated with each seat location on board the aircraft 12a. Each access station 88 can be used to interface the server 50 directly with a user's laptop computer, personal digital assistant (PDA) or other personal computing device of the user. The access stations 88 could also each comprise a seat back mounted computer/display. The LAN 56 enables bi-directional communication of data between the user's computing device and the server 50 such that each user is able to request a desired channel of television programming, access a desired website, access his/her email, or perform a wide variety of other tasks independently of the other users on board the aircraft 12.

The receive and transmit antennas 82 and 74, respectively, may comprise any form of steerable antenna. In one preferred form, these antennas comprise electronically scanned, phased array antennas. Phased array antennas are especially well suited for aviation applications where aerodynamic drag is important considerations. One particular form of electronically scanned, phased array antenna suitable for use with the present invention is disclosed in U.S. Pat. No. 5,886,671, assigned to The Boeing Co.

Referring further to FIG. 1, in operation of the system 10, the data content is preferably formatted into Internet protocol (IP) packets before being transmitted by either the ground station 22, or from the transmit antenna 74 of each mobile terminal 20. For the purpose of discussion, a transmission of data content in the form of IP packets from the ground station 22 will be referred to as a "forward link" transmission. IP packet multiplexing is also preferably employed such that data content can be provided simultaneously to each of the aircraft 12 operating within the coverage region 14a using unicast, multicast and broadcast transmissions.

The IP data content packets received by each of the transponders $18a_1$–$18a_4$ are then transponded by the transponders to each aircraft 12 operating within the coverage region 14a. While multiple satellites 18 are illustrated over coverage region 14a, it will be appreciated that at the present time, a single satellite is capable of providing coverage to an area encompassing the entire continental United States. Thus, depending upon the geographic size of the coverage region and the mobile platform traffic anticipated within the region, it is possible that only a single satellite incorporating a single transponder may be needed to provide coverage for the entire region. Other distinct coverage regions besides the continental United States include Europe, South/Central America, East Asia, Middle East, North Atlantic, etc. It is anticipated that in service regions larger than the continental United States, that a plurality of satellites 18 each incorporating one or more transponders may be required to provide complete coverage of the region.

The receive antenna 82 and transmit antenna 74 are each preferably disposed on the top of the fuselage of their associated aircraft 12. The receive antenna 74 of each aircraft receives the entire RF transmission of encoded RF signals representing the IP data content packets from at least one of the transponders $18a_1$–$18a_4$. The receive antenna 82 receives horizontally polarized (HP) and vertically polarized (VP) signals which are input to at least one of the receivers 66. If more than one receiver 66 is incorporated, then one will be designated for use with a particular transponder $18a_1$–$18a_4$ carried by the target satellite 18 to which it is pointed. The receiver 66 decodes, demodulates and downconverts the encoded RF signals to produce video and audio signals, as well as data signals, that are input to the server 50. The server operates to filter off and discard any data content not intended for users on the aircraft 12a and then forwards the remaining data content via the LAN 56 to the appropriate access stations 88. In this manner, each user receives only that portion of the programming or other information previously requested by the user. Accordingly, each user is free to request and receive desired channels of programming, access email, access the Internet and perform other data transfer operations independently of all other users on the aircraft 12a.

Referring further to FIG. 1, a transmission of data content from the aircraft 12a to the ground station 22 will be described. This transmission is termed a "return link" transmission. The antenna controller 86 causes the transmit antenna 74 to maintain the antenna beam thereof pointed at the target satellite 18a. The channels used for communication from each mobile terminal 20 back to the ground station 22 represent point-to-point links that are individually assigned and dynamically managed by the NOC 26 of the ground segment 16. For the system 10 to accommodate several hundred or more aircraft 12, multiple aircraft will need to be assigned to each transponder carried by a given satellite 18. The preferred multiple access methods for the return link are code division multiple access (CDMA), frequency divisional multiple access (FDMA), time division multiple access (TDMA) or combinations thereof. Thus, multiple mobile terminals 20 may be assigned to a single transponder $18a_1$–$18a_4$. Where a greater number of aircraft 12 incorporating a mobile terminal 20 are operated within the coverage region 14a, then the number of transponders required increases accordingly.

The receive antenna 82 may implement a closed-loop tracking system for pointing the antenna beam and for adjusting the polarization of the antennas based on receive signal amplitude. The transmit antenna 74 is slaved to the point direction and polarization of the receive antenna 82. An alternative implementation could use an open-loop tracking method with the pointing direction and polarization determined by knowledge of the aircraft's 12a position and attitude using an on-board inertial reference unit (IRU) and knowledge of the location of the satellites 18.

Encoded RF signals are transmitted from the transmit antenna 74 of the mobile terminal 20 of a given aircraft 12 to an assigned one of the transponders $18a_1$–$18a_4$, and transponded by the designated transponder to the ground station 22. The ground station 22 communicates with the content center 24 to determine and provide the appropriate data being requested by the user (e.g., content from the world wide web, email or information from the user's VPN).

An additional concern that must be taken into account with the system 10 is the potential for interference that may result from the small aperture size of the receive antenna 82. The aperture size of the receive antenna 82 is typically smaller than conventional "very small aperture terminal" (VSAT) antennas. Accordingly, the beam from the receive antenna 82 may encompass adjacent satellites along the geosynchronous arc. This can result in interference from satellites other than the target satellite being received by a particular mobile system 20. To overcome this potential problem, the system 10 preferably uses a lower than normal forward link data rate that overcomes the interference from adjacent satellites. For example, the system 10 operates at a preferred forward link data rate of at least about 5 Mbps per transponder, using a typical FSS Ku-band transponder (e.g., Telstar-6) and an antenna having an active aperture of about 17 inches by 24 inches (43.18 cm by 60.96 cm). For comparison purposes, a typical Ku-band transponder usually operates at a data rate of approximately 30 Mbps using conventional VSAT antennas.

Using a standard digital video broadcast (DVB) waveform, the forward link signal typically occupies less than 8 MHz out of a total transponder width of 27 MHz. However, concentrating the transponder power in less than the full transponder bandwidth could create a regulatory concern. FCC regulations presently regulate the maximum effective isotropic radiated power (EIRP) spectral density from a transponder to prevent interference between closely spaced satellites. Accordingly, in one preferred embodiment of the system 10, spread spectrum modulation techniques are employed in modulator 70 to "spread" the forward link signal over the transponder bandwidth using well known signal spreading techniques. This reduces the spectral density of the transponded signal, thus eliminating the possibility of interference between two or more mobile terminals 20.

It is also equally important that the transmit antenna 74 meets regulatory requirements that prevent interference to satellites adjacent to the target satellite 18. The transmit antennas used in most mobile applications also tend to be smaller than conventional VSAT antennas (typically reflector antennas that are 1 meter in diameter). Mobile transmit antennas used for aeronautical applications should have low aerodynamic drag, be lightweight, have low power consumption and be of relatively small size. For all these reasons, the antenna aperture of the transmit antenna 74 is preferably smaller than a conventional VSAT antenna. VSAT antennas are sized to create an antenna beam that is narrow enough to illuminate a single FSS satellite along the geosynchronous arc. This is important because FSS satellites are spaced at 2° intervals along the geosynchronous arc.

The smaller than normal antenna aperture of the transmit antenna 74 used with the present invention, in some instances, may create an antenna beam that is wide enough to irradiate satellites that are adjacent to the target satellite along the geosynchronous arc, which could create an interference problem. The likelihood of this problem is reduced by employing spread spectrum modulation techniques on the return link transmissions as well. The transmitted signal from the transmit antenna 74 is spread in frequency to produce an interfering signal at the adjacent satellite that is below the threshold EIRP spectral density at which the signal would interfere. It will be appreciated, however, that spread spectrum modulation techniques may not be required if the angular spacing between satellites within a given coverage region is such that interference will not be a problem.

Figures 3, 4:
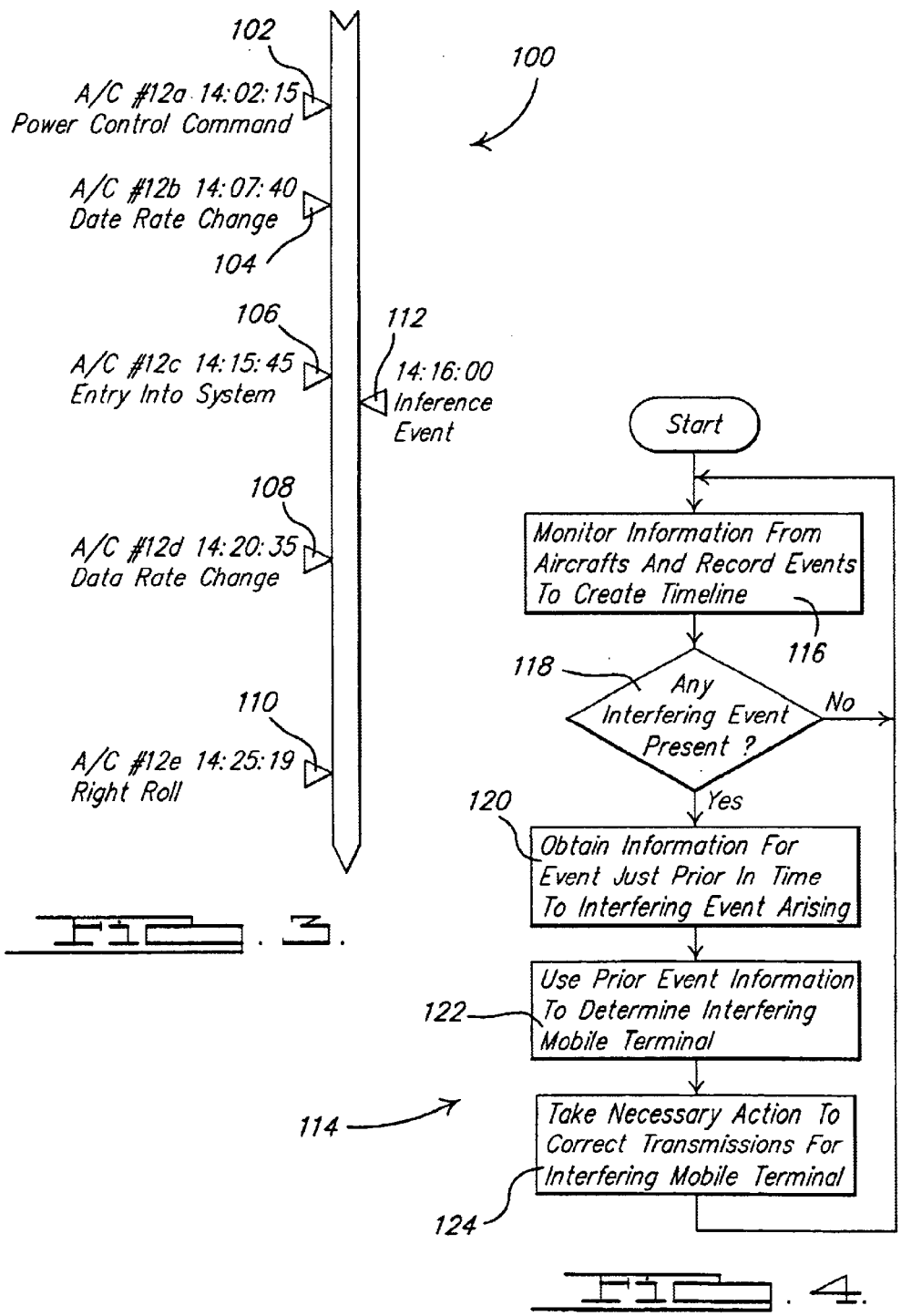
FIG. 3 is a drawing showing a time line of events recorded by the system and method of the present invention to quickly identify the aircraft which has caused an interference event to arise.
FIG. 4 is a flowchart illustrating the overall sequence of events performed in accordance with the method of the present invention.

Referring now to FIG. 3, the method of the present invention implemented by the system 10 will be described. FIG. 3 shows a time line 100 of a sequence of events being monitored [created] by a preferred embodiment of the system of the present invention. The present invention makes use of the ground station 22 which is in communication with the NOC 26. The NOC 26 is in constant communication with a plurality of mobile RF terminals 20 carried on a corresponding plurality of mobile platforms 12, such as aircraft, via transponded satellite 18*a* (referred to hereafter as the "target satellite").

The NOC 26 continuously receives various information from each mobile terminal 20 communicating with the ground station 22 such as the position of each aircraft (or other form of mobile platform) in terms of longitude and latitude, aircraft attitude information (e.g., heading, pitch and roll), the transmission rate of information transmitted to the ground station 22 as well as changes thereto, and the entry of each aircraft into communication with the ground station. The NOC 26 transmits power control commands to the aircraft 12, as well as various other anomalies. In addition, the NOC 26 can monitor and record the received Eb/No (ratio of energy-per-bit to noise spectral density), transponder noise temperature of the transponder associated with the target satellite 18*a*, and the pointing performance of the antennas 74, 82 used with the mobile system 20 on each aircraft 12.

The above information is recorded by the NOC 26 to create the time line 100 shown in FIG. 3. This time line 100 gives, as an example, that aircraft 12*a* was given a power control command at 14:02:15 (i.e., just slightly after 2:02 pm), as indicated at point 102. At point 104, aircraft 12*b* changed its data rate for transmitting information to the NOC 26. At point 106, aircraft 12*c* entered into communications with the NOC 26 at 14:15:45 (i.e., slightly before 2:16 pm). At point 108 (at 35 seconds past 2:20 p.m.), aircraft number 12*d* changed its data rate for communicating with the ground station. At point 110, aircraft number 12*e* began a right roll at 14:25:19 (just after 2:25 pm). Point 112 denotes an interference event that began to occur at 14:16:00 (2:16 pm).

As soon as the NOC 26 learns of the interference event it begins looking at each record on the time line 100, which will typically be stored in a database (not shown) accessible by the NOC. This information is used to determine which transmission/event may have caused the interference to arise. Typically, the first transmission/event that occurred prior to the interference occurring will be the cause, or will lead to the specific aircraft 12 that has caused the interference event to arise. In this example, aircraft 12*c* and its entry into communication with the ground station 22 has caused the interference. The NOC 26 can command the aircraft 12*c* to shut down its mobile terminal 20 or send other commands to aircraft 12*c* to quickly remedy the situation so as to remove the interference.

FIG. 4 represents a flowchart 114 which the NOC 26 executes in creating and monitoring aircraft 12 making contact with the ground station 22, and detecting which aircraft 12 has a mobile terminal 20 which has caused an interference event to arise. At step 116, communications from each of the aircraft 12 accessing the target satellite 18*a* are recorded to create the time line of FIG. 3. At step 118, the NOC 26 checks to ensure that no interference event has arisen. If this check is negative, then step 116 repeated.

If the check at step 118 produces a "yes" answer, then the NOC 26 obtains the information from the time line of FIG. 3 to determine the event that occurred just prior to the interference event arising, as indicated at step 120. The NOC 26 next uses this information to determine the specific mobile terminal 20 which has caused the interference event to arise, as indicated at step 122. At step 124, the NOC 26 takes the necessary action to correct (i.e., remove) the interference event. This may include ordering the mobile terminal 20 to cease transmissions or may involve transmitting power control commands to the interfering mobile terminal which cause it to reduce its transmit power. Once the interference event has been corrected, steps 116 and 118 are repeated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for rapidly determining which one of a plurality of mobile terminals is causing interference with a transponded satellite orbiting in a vicinity of a target satellite with which the mobile terminals are in communication with, the method comprising the steps of:

using a network operations center (NOC) to monitor and record each transmission event occurring between each said mobile terminal and said target satellite;

creating a time line of said transmissions events, said time line representing a real time, sequential record of said transmission events, and storing said sequential record in a database accessible to said NOC;

when said NOC is informed of an interference event occurring with a satellite adjacent to said target satellite, causing said NOC to access said database, in real time, to determine a specific transmission event that occurred immediately prior to the time that said interference event arose; and using said NOC to analyze, in real time, said specific transmission event to eliminate said interference condition.

2. The method of claim 1, wherein each said mobile terminal periodically transmits to said NOC attitude information relating to at least one of the group comprising heading, pitch and roll.

3. The method of claim 1, wherein each said mobile terminal periodically transmits to said NOC latitude and longitude information concerning its present position.

4. The method of claim 1, wherein each said mobile terminal periodically transmits information to said NOC concerning a rate of transmission of said information being transmitted.

5. The method of claim 1, wherein said NOC monitors an energy-per-bit to noise spectral density of signals received from each of said mobile terminals.

6. A method for quickly determining which one of a plurality of mobile terminals being carried by a mobile platform is causing interference with a transponded satellite orbiting in a vicinity of a target satellite with which the mobile terminals are in communication with, the method comprising the steps of:

using a ground-based component to monitor and record each transmission event occurring between each one of said mobile terminals and said target satellite, each said transmission event including an identifier transmitted by its associated said mobile terminal to thereby uniquely identify the source of each said transmission event;

using said ground-based component to construct a time line from said recorded transmission events of each of said mobile terminals, said time line representing a real time, sequential record of said transmission events; and using said ground-component to extrapolate from said time line which one of said mobile terminals has caused said interference.

7. The method of claim 6, wherein each said mobile terminal periodically transmits to said ground-based component information relating to its longitude and latitude.

8. The method of claim 6, wherein each said mobile terminal periodically transmits to said ground-based component information relating to its attitude.

9. The method of claim 6, where said step of using said ground component to extrapolate said interference event comprises:

identifying that said transmission event that occurred immediately prior to said interference arising.

10. A method for quickly determining which one of a plurality of mobile terminals associated with a specific mobile platform is causing interference with a transponded satellite orbiting in a vicinity of a target satellite with which the mobile terminals are in communication with, the method comprising the steps of:

using a ground-based component to monitor and record each transmission event occurring between each one of said mobile terminals and said target satellite, each said transmission event including an identifier transmitted by its associated said mobile terminal to thereby uniquely identify the source of each said transmission event;

using said ground-based component to construct a time line from said recorded transmission events of each of said mobile terminals, said time line representing a sequential record of said transmission events; and using said ground component to identify, from said time line, that particular transmission event occurring immediately prior to said interference arising; and determining that said particular transmission event that has caused said interference.

11. The method of claim 10, wherein each said mobile terminal periodically reports its attitude information to said ground-based component.

12. The method of claim 10, wherein each said mobile terminal periodically reports its latitude and longitude to said ground-based component.

13. The method of claim 10, wherein said time line represents a real time record of said transmission events.

14. The method of claim 10, wherein said ground-based component periodically transmits power control commands to each of said mobile terminals.

15. A method for quickly determining which one of a plurality of mobile terminals being carried by a mobile platform is causing interference with a transponded satellite orbiting in a vicinity of a target satellite with which the mobile terminals are in communication with, the method comprising the steps of:

using a ground-based component to monitor and record each transmission event occurring between each one of said mobile terminals and said target satellite, each said transmission event including an identifier transmitted by its associated said mobile terminal to thereby uniquely identify the source of each said transmission event;

using said ground-based component to construct a time line from said recorded transmission events of each of said mobile terminals, said time line representing a real time, sequential record of said transmission events; and using said ground-component to extrapolate from said time line which one of said mobile terminals caused a specific transmission event that occurred just prior to said interference arising, to thus identify a specific one of said mobile terminals that has caused said interference.

* * * * *